Aug. 21, 1956  E. E. LINDSEY  2,759,826
COMESTIBLE PRODUCT
Filed Feb. 10, 1953
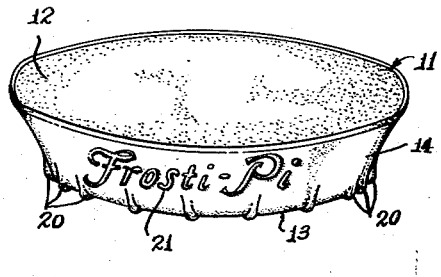
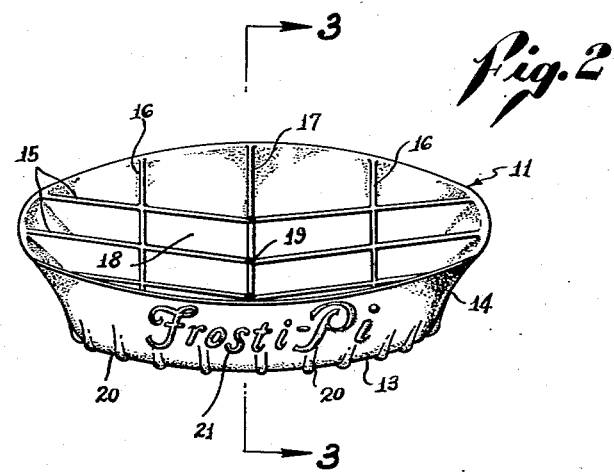
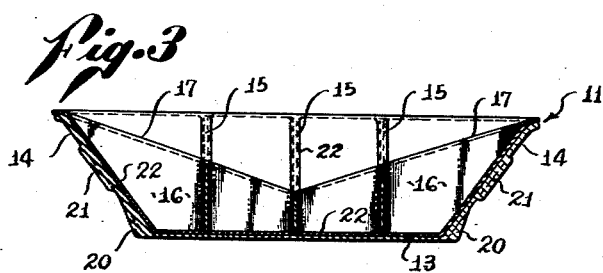
INVENTOR.
ERNEST E. LINDSEY
BY George R. Bliss
Attorney Patented Aug. 21, 1956

2,759,826

COMESTIBLE PRODUCT

Ernest E. Lindsey, Los Angeles, Calif.

Application February 10, 1953, Serial No. 336,069

4 Claims. (Cl. 99—88)

This invention relates to a comestible product, and particularly to a comestible product comprising both, a beaten and frozen confection material such as ice cream, ice milk, sherbet, water ice, and the like, which is liquid or semi-liquid at normal temperatures, and also an edible container for this material. It also relates to the container itself.

It is well known to serve such frozen confections in edible containers, producing what is commonly known as an "ice cream cone," or simply a "cone." The word "cone" is also used to designate the container alone. The edible container may also be in the shape of a cup.

Serving frozen confections and other edible material in edible containers has two very apparent advantages. It obviates the littering of the premises with dirty, waste containers thrown away after the contents are eaten. This is an important consideration at picnics, baseball games and other spectacles, public gatherings and in the sale of the edible products from street side stands.

An edible container also has the advantage of providing with the frozen confection, or for that matter, with any other prepared food, especially of a semi-liquid nature, a crisp cereal holder which affords, with the material in the holder, a tasty and balanced food product adapted to be eaten out of hand.

Difficulties have attended the making, with the standard and conventional cones or cups, of a "sondae," "sundae," or "sunday," as it is variously called, i. e., a service of beaten and frozen food either covered with flavored syrup, crushed fruits or nuts, or whipped cream or marshmallow materials, or centrally hollowed and the hollow similarly filled.

Due to the small breadth of such prior art edible containers relative to their depth, the topping is quickly eaten and the remainder is plain ice cream, sherbet or the like. Sundaes and similar confections have therefore proved unsatisfactory when made with the conventional edible cups and cones. On the other hand, if a wide edible container is used, the frozen material melts, unless consumed with unpleasant rapidity, and runs onto the clothes and hands of the person eating it. However if this latter objection to a wide edible container is overcome, such a container is superior to the conventional edible cone or cup for making sundaes, and other topped frozen confections. For other reasons, also, a relatively shallow and wide edible container is sometimes preferably to a deep, narrow edible container for use with an edible filler. For example, some persons tend to eat the filler from a conventional ice cream cone and throw away much of the cone instead of eating it. Because the filler overlies in a relatively thin layer a relatively wide container the customer is induced to eat all or nearly all of the container, leaving little if any of it, to be thrown away on the ground.

According to this invention, the edible container is in the form of a wide shallow rimmed, cross ribbed plate of a crisp baked material such as bread stuff or cake, which has been treated upon its upper surface to render it impervious to liquids. When such a container is filled with a frozen confection, the frozen material may be eaten leisurely without danger of soiling the clothing, without spilling on nearby objects and without loss of a portion of the confection because the plate will not soften or leak and the filler is held back by the cross ribs until eaten. Such a container may be combined with a filler of frozen comestible topped with syrup, fruits, nuts, etc., and it may also be used under some conditions which make a relatively thin wide layer of the frozen material desirable, even when the frozen material is not topped with a layer of syrup, fruits, nuts and the like. Such a containing plate may be of advantage for other than frozen foods under conditions wherein the relatively rigid but edible plates combines from a food standpoint with the filler material to provide a desirable food ensemble to be eaten out of hand. Chili beans on a baked breadstuff plate may be mentioned as an example.

Wherever the invention is used as on outings and picnics, on highways, and in stores, it is obvious that the litter of dirty pasteboard plates is eliminated.

One embodiment of the invention is shown in the drawing, of which—

Fig. 1 is a perspective view of a small ice cream pie or similar product;

Fig. 2 is a perspective view of a container shown in Fig. 1; and

Fig. 3 is a vertical section taken along the line 3—3 of Fig. 2.

In Figure 1 is shown a container 11 and a filling material 12. In the production of this form of the invention, the container 11 is placed under a discharging device, and the frozen material 12 as it issues under control from the discharging device falls into the container and is allowed to fill the container to the desired depth. If the product is to be of the ice cream or ice milk sundae type, the topping of syrup, fruit, crushed nuts, or whatever it may be, is then spread over the top surface of the frozen material. When the container is filled from a freezer such as is shown in applicant's Patents Nos. 2,272,715 and 2,304,579 the frozen material is forced into the outer portions of the container and the central portions may then be filled with whipped cream or other materials, producing a wide variety of novel, attractive, and delightful confections.

The container as shown in Figures 2 and 3 may be suitably made from a batter of any desired mix, and baked in molds in the form shown in Figures 2 and 3. The container comprises a bottom wall 13, an upwardly and outwardly flaring rim wall 14, preferably integral with the bottom wall 13, a first set of parallel rib walls 15, also preferably integrally made with the rim wall 14 and bottom wall 13 and a second series of rib walls 16 disposed perpendicularly or at any other suitable angle to the rib walls 15 and also preferably integral with the rim wall 14, bottom wall 13 and also with the ribs 15. While the number of ribs 15 and 16 will depend upon the size of the plate, in a plate of the small size shown in the drawing which will have the largest use in practice, there will be three ribs 15 and three ribs 16, one of each set of three ribs being located on a diameter of the plate and the other two ribs being equi-distantly spaced on either side of the central rib and parallel thereto.

The upper edges 17 of both ribs 15 and ribs 16 are shown as inclined somewhat inwardly and downwardly towards the center of the plate. While this feature is not necessary to the invention, it does facilitate the movement of the falling frozen confection toward the center of the plate insuring the filling of the central pockets. As shown in the drawings there are sixteen of these pockets 18, each of which receives a portion of the frozen material as it is delivered to the container.

In eating the edible filler from such a plate, the ribs prevent or retard lateral movement of the filler from one pocket to an adjoining pocket in any direction. The pockets each contain but a small portion of the filling material, about enough for one or two bites with the result that as the pie plate and its contents are progressively eaten, all but a small part of the filling material is held back on the plate and prevented from spilling.

For convenience in holding the plate in the hand, slight bas-relief projections 20 are formed at the lower edge of the rim 14 which engage the fingers of the hand and prevent sidewise or vertical slippage of the container. The letters of a fanciful name or of a designating term for the product may be similarly formed in relief on the outer section of the rim 14 as indicated at 21, to provide additional grips for the fingers.

Most if not all of the baked products suitable for use as the comestible material, will soften and collapse under the action of a liquid or semi-liquid filler. It will thus soften under the action of a filler which is initially liquid, or under the action of a filler which is initially frozen but as it melts becomes semi-liquid or liquid in character. To eliminate this difficulty the entire inner surfaces of the container, that is of the bottom wall and of the rim 14, and both lateral surfaces of the ribs 15 and 16 are coated prior to use by the application of a thin film or layer 22 of some edible material impervious to liquid or semi-liquid materials, and which will not soften when in contact with such materials. This layer protects the bottom wall, the rim, and ribs of the pie plate from the softening action of the filler material. For an ice cream or ice milk or sherbet pie, this lining may be of chocolate or caramel icing, or a similar material. It is obvious that any other edible material which has the necessary protective qualities may be used in a similar manner.

I claim:

1. A shallow edible crisp plate of which the outer rim portion is upwardly flanged for retaining the contents of the plate, and which has an upstanding transverse rib structure on the plate bottom wall and surrounded by the said flange, said rib structure having a substantial depth from the upper edges of the ribs to the bottom plate wall, said depth approximately that of the said flange, the upper edges of the said flange and of the adjacent portions of the rib structure being substantially flush with each other, the said rib structure being constructed to provide a plurality of small upwardly opening separated pockets extending continuously across the plate within the area enclosed by the said flange.

2. The plate defined in claim 1, in which said plate also has a liquid impervious edible lining on the upper surface of the plate, the inner surface of the flange, and all surfaces of the ribs, and in which said plate also has a layer of beaten frozen edible material within the pockets on the plate, said layer extending upwardly above the pockets.

3. A shallow edible crisp plate of which the outer edge portion is upwardly flanged for retaining the contents of the plate, said plate having a first series of parallel upstanding ribs extending from flange to flange across the plate in a first direction; a second series of parallel upstanding ribs, extending from flange to flange across the plate in a second direction and intersecting the first series of ribs, providing a continuous unbroken integrally formed network of upstanding partition walls integrally connected to the bottom and flange of the plate, said walls being of substantial depth approximating that of the flange.

4. The combination defined in claim 3 in which the upper edges of the ribs incline slightly downwardly and inwardly from the upper edge of the flange toward the central portion of the plate.

References Cited in the file of this patent

UNITED STATES PATENTS

| | | |
|---|---|---|
| 1,511,878 | Gargay | Oct. 14, 1924 |
| 1,558,922 | Reilly | Oct. 27, 1925 |
| 1,715,857 | Meyer | June 4, 1929 |
| 1,899,511 | Leaf | Feb. 28, 1933 |
| 2,087,068 | Pape | July 13, 1937 |